United States Patent
Matsufuji et al.

[11] Patent Number: 5,914,160
[45] Date of Patent: Jun. 22, 1999

[54] ADHESIVE TUBE COMPOSITE TUBE AND METHOD FOR SEALING USING THE SAME

[75] Inventors: Shigeo Matsufuji; Tomoyoshi Kishimoto, both of Osaka, Japan

[73] Assignee: Sumitomo Electric Industries, LTD., Osaka, Japan

[21] Appl. No.: 08/553,099

[22] Filed: Nov. 3, 1995

[30] Foreign Application Priority Data

Nov. 4, 1994 [JP] Japan ..................... 6-295640

[51] Int. Cl.$^6$ .................. B65B 53/02; F16L 11/06
[52] U.S. Cl. ............. 428/34.9; 428/36.91; 428/212; 428/214; 428/913; 174/35 R; 174/84 R; 174/DIG. 8; 138/118; 138/118.1; 138/137
[58] Field of Search .................. 428/34.9, 913, 428/36.9, 36.91, 212, 214; 174/DIG. 8, 35 R, 84 R; 138/118, 118.1, 137, 141

[56] References Cited

U.S. PATENT DOCUMENTS

| | | | |
|---|---|---|---|
| 4,521,470 | 6/1985 | Overburgh et al. | 428/36 |
| 4,552,819 | 11/1985 | Hibino | 428/516 |
| 4,585,607 | 4/1986 | Krackeler et al. | 264/229 |
| 5,515,836 | 5/1996 | Delalle et al. | 174/87 |
| 5,549,943 | 8/1996 | Vicik | 428/34.8 |

FOREIGN PATENT DOCUMENTS

| | | |
|---|---|---|
| 0402841 | 12/1990 | European Pat. Off. . |
| 0481081 | 4/1992 | European Pat. Off. . |
| 3527436 | 2/1987 | Germany . |
| 1-236268 | 9/1989 | Japan . |
| 6-6341 | 1/1994 | Japan . |

OTHER PUBLICATIONS

Encyclopedia of Polymer Science & Engineering, vol. 14, p. 666, 1985.

Primary Examiner—Rena L. Dye
Attorney, Agent, or Firm—Sughrue, Mion, Zinn, Macpeak & Seas, PLLC

[57] ABSTRACT

An adhesive tube, a composite tube comprising a heat-shrinkable tube having on the inner surface thereof the adhesive tube, and a method for sealing an object having an uneven surface comprising the steps of: inserting the object in the composite tube and then heating the composite tube. The adhesive tube comprises a double-layered thermoplastic resin layer comprising an outer layer and an inner layer, the outer layer having a melt index smaller than that of the inner layer.

24 Claims, 1 Drawing Sheet

ADHESIVE TUBE COMPOSITE TUBE AND METHOD FOR SEALING USING THE SAME

FIELD OF THE INVENTION

The present invention relates to an adhesive tube to be inserted in a heat-shrinkable tube which is useful for waterproof sealing and/or insulation of a joint of wires or cables or for binding of a plurality of wires or cables. The present invention also relates to a composite tube comprising a heat-shrinkable tube having inserted therein the adhesive tube; and a sealing method using the composite tube.

BACKGROUND OF THE INVENTION

A tape-winding method is one of conventional methods for waterproof sealing or insulation of a joint of wires or cables or for binding a plurality of wires or cables. However, the tape-winding method has poor workability and does not always provide sufficient protection for a long period of time and is therefore lacking in reliability.

Another method for binding a plurality of wires or cables comprises, as disclosed in JP-A-1-236268 (the term "JP-A" as used herein means an "unexamined published Japanese patent application"), providing a moisture-blocking arrangement for cables in a slit of a base material comprising a thermoplastic resin, making the base material into a coil, putting a heat-shrinkable sleeve on the coil, and heating the sleeve to shrink and to fluidize the base material in the sleeve thereby sealing the moisture-blocking arrangement. However, this method is poor in workability because insertion of the moisture-blocking arrangement into the base material requires much labor and time. Further, in the case where there is a great difference between the outer diameter of cables and the inner diameter of the heat-shrinkable sleeve to make a considerable gap therebetween, a possibility arises in that the thermoplastic resin does not thoroughly flow into the gap on heating and the gap remains unfilled, resulting in a failure of sufficient sealing.

Another method for waterproof sealing or insulation of the joint of wires or cables comprises, as disclosed in JP-B-6-6341 (the term "JP-B" as used herein means an "examined published Japanese patent application"), putting a sealant and a heat-shrinkable tube having a hot-melt adhesive layer on the joint and heating the tube to shrink and to fluidize the hot-melt adhesive thereby sealing the gap. Where there is a great difference between the outer diameter of cables to be sealed and the inner diameter of the heat-shrinkable tube to make a considerable gap therebetween, this method also involves a possibility in that the thermoplastic resin does not thoroughly flow into the gap on heating leaving the gap unfilled, resulting in a failure of sufficient sealing.

In order to avoid gap-formation between cables and a heat-shrinkable tube after shrinkage, it is preferred to increase the thickness of the hot-melt adhesive layer to sufficiently increase the amount of the adhesive which is fluidized on heating. However, a thermoplastic resin having high flowability has poor extrusion molding properties since it shows large variation in outer diameter, and the extruded tubing adheres to each other during the production.

SUMMARY OF THE INVENTION

An object of the present invention is to eliminate the above-described problems and to provide an adhesive tube having improved workability and improved reliability of quality, without increasing the amount of a thermoplastic resin layer serving as an adhesive, and thereby without causing variation of the thermoplastic resin layer in outer diameter.

Another object of the present invention is to provide a composite tube using the adhesive tube.

Still another object of the present invention is to provide a method for sealing an object having an uneven surface using the composite tube.

Other objects and effects of the present invention will be apparent from the following description.

The present invention relates to, as a first aspect, an adhesive tube comprising a double-layered thermoplastic resin layer comprising an outer layer and an inner layer, the outer layer having a melt index smaller than that of the inner layer.

The present invention also relates to, as a second aspect, a composite tube comprising a heat-shrinkable tube having on the inner surface thereof the adhesive tube according to the first aspect of the present invention.

The present invention further relates to, as a third aspect, a method for sealing an object having an uneven surface, the method comprising the steps of: inserting the object in the composite tube according to the second aspect of the present inventions; and then heating the composite tube.

DETAILED DESCRIPTION OF THE INVENTION

Figure 1:
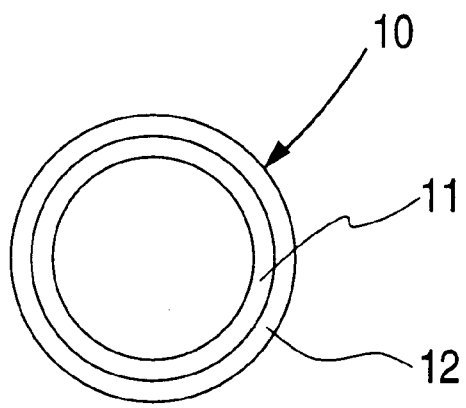
FIG. 1 shows a cross section of one embodiment of an adhesive tube according to the present invention.

A cross section of an embodiment of an adhesive tube according to the present invention is shown in FIG. 1. In this embodiment, the adhesive tube comprises a double-layered thermoplastic resin layer 10, which comprises an outer layer 12 and an inner layer 11. The melt index of the outer layer 12 is smaller than that of the inner layer 11.

Figure 2:
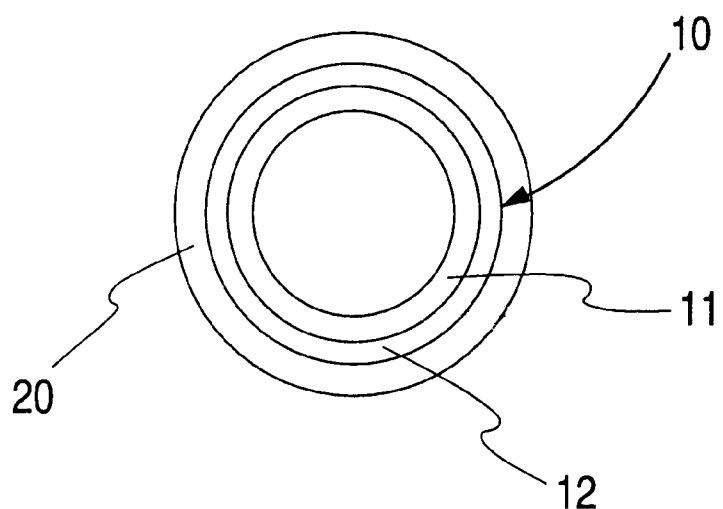
FIG. 2 shows a cross section of one embodiment of a composite tube according to the present invention.

A cross section of an embodiment of a composite tube according to the present invention is shown in FIG. 2. In this embodiment, an adhesive tube 10 is laminated on the inner wall of a heat-shrinkable tube 20. The adhesive tube 10 has the same constitution as the above embodiment of the adhesive tube.

When the composite tube of the present invention is sufficiently heated, the heat-shrinkable tube completely shrinks, and the adhesive tube inside the heat-shrinkable tube maintains its thermoplastic property, so that no unevenness takes place on the inner and outer surfaces of the heat-shrinkable tube after shrinkage.

When the outer diameter of the inserted wire or cable to be sealed is approximately equal to the inner diameter of the completely shrunk heat-shrinkable tube, the inner layer maintaining its thermoplastic property is pressed out of the outer layer, covers the inserted wire or cable, and completely fills the gap between the wire or cable and the tube.

Examples of the thermoplastic resin to be used as an adhesive tube includes a polyethylene, an ethylene-vinyl acetate copolymer, an ethylene-ethyl acrylate copolymer, an ethylene-methyl acrylate copolymer, a polyamide, and a polyester. Among these, a polyamide, an ethylene-vinyl acetate copolymer, and a polyester are preferably used, with a polyamide and an ethylene-vinyl acetate copolymer being more preferred. The thermoplastic resin is not a crosslinked polymer because it should be melted and fill the gaps on heating.

The heat-shrinkable tube may comprise an electron radiation-crosslinked polyolefin, such as an ethylene-vinyl acetate copolymer or an ethylene-ethyl acrylate copolymer.

From the viewpoint of adhesion, the resin constituting the heat-shrinkable tube and that constituting at least the outer layer of the adhesive tube which comes into contact with the heat-shrinkable tube are preferably the same. However, these resins are not particularly limited in kind as long as they are brought into intimate adhesion to each other after shrinkage.

The thermoplastic resins constituting the inner and outer layers of the adhesive tube are not also limited as long as they are brought into intimate adhesion to each other after shrinkage.

The total thickness of the inner and outer layers of the adhesive tube is preferably 0.2 mm or more for sealing the object having an uneven surface. The thickness of the outer layer is generally from 0.1 to 10 mm, preferably from 0.2 to 0.5 mm, more preferably from 0.3 to 0.4 mm. The thickness of the inner layer is generally from 0.1 to 10 mm, preferably from 0.2 to 0.5 mm, more preferably from 0.3 to 0.4 mm.

The adhesive tube can be produced by co-extrusion with high precision of its outer diameter in the longitudinal direction by selecting, as a thermoplastic resin for the outer layer, a resin having a melt index of from 0.1 to 10, preferably 1 to 10, more preferably from 2 to 7, and is lower than that of the resin for the inner layer. The melt index of the inner layer is generally from 2 to 140, preferably from 20 to 140, more preferably from 20 to 80. The melt index used herein means an amount (g) of molten resin effused per 10 minutes through a nozzle (specified in JIS K6730) at 190° C. under a load of 2,160 g. The combination of the resulting adhesive tube and a heat-shrinkable tube provides a composite tube having an inner diameter of the innermost layer of from 0.3 to 25 mm, preferably from 2 to 7 mm, and the outermost diameter (i.e., the outer diameter of the heat-shrinkable tube) of 1.3 to 51 mm, preferably 5 to 15 mm. The difference between the outer diameter of the adhesive tube and the inner diameter of the heat-shrinkable tube is generally from 0.1 to 0.3 mm, preferably 0.2 mm.

The inner layer of the adhesive tube may be endowed with adhesiveness to a polyethylene, an ethylene-vinyl acetate copolymer, an ethylene-ethyl acrylate copolymer, an ethylene-methyl acrylate copolymer, a polyamide, etc. by proper selection of the thermoplastic resin therefor.

The present invention will be described in more detail by referring to the following examples, but the present invention is not construed as being limited thereto.

EXAMPLE 1

An uncrosslinked double-layered adhesive tube having an inner diameter of 5.8 mm, an outer diameter of 6.8 mm, and a length of several tens of millimeters in which the outer layer comprised an ethylene-ethyl acrylate copolymer having a melt index of 5 g/10min ("Evaflex A701" produced by Du Pont-Mitsui Polychemicals Co., Ltd.) and the inner layer had a thickness of 0.4 mm and comprised a polyamide having a melt index of 70 g/10min ("Versalon DPX-1301" produced by Henkel Hakusui Corporation) was completely inserted into a heat-shrinkable tube having an inner diameter of 7.1 mm and an outer diameter of 7.6 mm and having the same length as the adhesive tube, which comprised an ethylene-ethyl acrylate copolymer having a melt index of 5 g/10min before crosslinking ("Evaflex A701" produced by Du Pont-Mitsui Polychemicals Co., Ltd.), capable of shrinking by half in its radial direction on heating. When the resulting composite tube was shrunk at 125° C., the gap in the heat-shrinkable tube was completely filled up with the inner layer of the adhesive tube.

EXAMPLE 2

An uncrosslinked double-layered adhesive tube having an inner diameter of 5.8 mm, an outer diameter of 6.8 mm, and a length of several tens of millimeters in which the outer layer comprised a polyethylene having a melt index of 1.4 g/10min ("Sumikathene C215" produced by Sumitomo Chemical Co., Ltd.) and the inner layer had a thickness of 0.4 mm and comprised a polyamide having a melt index of 50 or more ("Versalon DPX-1301" produced by Henkel Hakusui Corporation) was completely inserted in a heat-shrinkable tube having an inner diameter of 7.1 mm and an outer diameter of 7.6 mm and having the same length as the adhesive tube, which comprised an ethylene-methyl acrylate copolymer having a melt index of 6 g/10min before crosslinking ("Yukalon XH-500M" produced by Mitubishi Chemical Co., Ltd.), capable of shrinking by half in its radial direction on heating. When the resulting composite tube was shrunk at 120° C., the gap in the heat-shrinkable tube was completely filled up with the inner layer of the adhesive tube.

EXAMPLE 3

An uncrosslinked double-layered adhesive tube having an inner diameter of 5.8 mm, an outer diameter of 6.8 mm, and a length of several tens of millimeters in which the outer layer comprised an ethylene-ethyl acrylate copolymer having a melt index of 5 g/10min ("Evaflex A701" produced by Du Pont-Mitsui Polychemicals Co., Ltd.) and the inner layer had a thickness of 0.4 mm and comprised a polyamide having a melt index of 70 g/10min ("Versalon DPX-1301" produced by Henkel Hakusui Corporation) was completely inserted in a heat-shrinkable tube having an inner diameter of 7.1 mm and an outer diameter of 7.6 mm and having the same length as the adhesive tube, which comprised an ethylene-vinyl acetate copolymer having a melt index of 1.5 g/10min before crosslinking ("Evatate H2020F" produced by Sumitomo Chemical Co., Ltd.), capable of shrinking by half in its radial direction on heating. When the resulting composite tube was shrunk at 125° C., the gap in the heat-shrinkable tube was completely filled up with the inner layer of the adhesive tube.

COMPARATIVE EXAMPLE 1

A polyamide having a melt index of 70 ("Versalon DPX-1301" produced by Henkel Hakusui Corporation) was extruded into a single-layered tube having an inner diameter of 5.8 mm and an outer diameter of 6.7 mm. The extruded tube showed considerable variation in diameter. The tube was cut to a length of several tens of millimeters and inserted into a heat-shrinkable tube having the same length having an inner diameter of 6.8 mm and an outer diameter of 7.7 mm comprising an ethylene-ethyl acrylate copolymer having a melt index of 5 g/10min before crosslinking ("Evaflex A701" produced by Du Pont-Mitsui Polychemicals Co., Ltd.). However, 50% or more of the tubes per lot could not be completely inserted, resulting in a poor yield. Since the extruded tube was so sticky to each other immediately after extrusion, it was necessary to cut the tube immediately after extrusion and keep the cut tubes separately, which required infinite labor.

As described above, the adhesive tube of the present invention has excellent precision of outer diameter in its longitudinal direction and makes a great contribution to the improvements of workability and product quality. A composite tube comprising a heat-shrinkable tube having inserted therein the adhesive tube of the present invention can have desired adhesive strength and desired characteristics through proper choice of the resin materials for the inner and outer layers of the adhesive tube and the heat-shrinkable tube and is extremely effective in sealing an object with an uneven surface, for example, joints of wires or cables or a wire or cable bundle.

While the invention has been described in detail and with reference to specific examples thereof, it will be apparent to one skilled in the art that various changes and modifications can be made therein without departing from the spirit and scope thereof.

What is claimed is:

1. An adhesive tube, which is capable of being inserted into a heat-shrinkable tube to form a composite tube for waterproof sealing or insulation or both waterproof sealing and insulation of a joint of wires or cables or for binding of a plurality of wires or cables, said adhesive tube comprising a double-layered thermoplastic resin tube comprising an outermost thermoplastic resin layer and an innermost thermoplastic resin layer, said outermost layer having a melt index smaller than that of said innermost layer, wherein the thermoplastic resin is not crosslinked, and wherein said double-layered thermoplastic resin tube has a total thickness of at least 0.2 mm.

2. An adhesive tube as claimed in claim 1, wherein said outermost layer and said innermost layer each comprises a polyethylene, an ethylene-vinyl acetate copolymer, an ethylene-ethyl acrylate copolymer, an ethylene-methyl acrylate copolymer, a polyamide, or a polyester.

3. An adhesive tube as claimed in claim 1, wherein said outermost layer has a melt index of from 0.1 to 10 g/10min as measured at a temperature of 190° C. and a load of 2,160 g according to JIS K67305.

4. An adhesive tube as claimed in claim 1, wherein said innermost layer has a melt index of from 2 to 140 g/10min as measured at a temperature of 190° C. and a load of 2,160 g according to JIS K6730.

5. An adhesive tube as claimed in claim 1, wherein the inner diameter of said innermost layer is from 0.3 to 25 mm.

6. An adhesive tube as claimed in claim 1, wherein the inner diameter of said innermost layer is from 2 to 7 mm.

7. An adhesive tube as claimed in claim 1, wherein the thickness of the innermost layer is from 0.2 to 0.5 mm, and wherein the thickness of the outermost layer is from 0.2 to 0.5 mm.

8. An adhesive tube as claimed in claim 1, wherein the thickness of the innermost layer is from 0.3 to 0.4 mm, and wherein the thickness of the outermost layer is from 0.3 to 0.4 mm.

9. An adhesive tube as claimed in claim 1, wherein said innermost layer has a melt index of from 20 to 140, and wherein said outermost layer has a melt index of from 1 to 10, said melt index being measured at a temperature of 190° C. and a load of 2,160 g according to JIS K6730.

10. An adhesive tube as claimed in claim 1, wherein said innermost layer has a melt index of from 20 to 80, and wherein said outermost layer has a melt index of from 2 to 7, said melt index being measured at a temperature of 190° C. and a load of 2,160 g according to JIS K6730.

11. A composite tube for waterproof sealing or insulation or both waterproof sealing and insulation of a joint of wires or cables or for binding of a plurality of wires or cables, said composite tube comprising an adhesive tube inserted in a heat-shrinkable tube, said adhesive tube comprising a double-layered thermoplastic resin tube comprising an outermost thermoplastic resin layer and an innermost thermoplastic resin layer, said outermost layer having a melt index smaller than that of said innermost layer, wherein thermoplastic resin is not crosslinked, and wherein said double-layered thermoplastic resin tube has a total thickness of at least 0.2 mm.

12. A composite tube as claimed in claim 11, wherein said outermost layer and said innermost layer each comprises a polyethylene, an ethylene-vinyl acetate copolymer, an ethylene-ethyl acrylate copolymer, an ethylene-methyl acrylate copolymer, a polyamide, or a polyester.

13. A composite tube as claimed in claim 11, wherein said outermost layer and said innermost layer each comprises a polyamide, an ethylene-vinyl acetate copolymer, and a polyester.

14. A composite tube as claimed in claim 11, wherein said heat-shrinkable tube comprises an electron radiation-crosslinked polyolefin.

15. A composite tube as claimed in claim 11, wherein said outermost layer has a melt index of from 0.1 to 10 g/10min as measured at a temperature of 190° C. and a load of 2,160 g according to JIS K6730.

16. A composite tube as claimed in claim 11, wherein said innermost layer has a melt index of from 2 to 140 g/10min as measured at a temperature of 190° C. and a load of 2,160 g according to JIS K6730.

17. A composite tube as claimed in claim 11, wherein the inner diameter of said innermost layer is from 0.3 to 25 mm.

18. A composite tube as claimed in claim 11, wherein the inner diameter of said innermost layer is from 2 to 7 mm.

19. A composite tube as claimed in claim 11, wherein the thickness of the innermost layer is from 0.2 to 0.5 mm, and wherein the thickness of the outermost layer is from 0.2 to 0.5 mm.

20. A composite tube as claimed in claim 11, wherein the thickness of the innermost layer is from 0.3 to 0.4 mm, and wherein the thickness of the outermost layer is from 0.3 to 0.4 mm.

21. A composite tube as claimed in claim 11, wherein said innermost layer has a melt index of from 20 to 140, and wherein said outermost layer has a melt index of from 1 to 10, said melt index being measured at a temperature of 190° C. and a load of 2,160 g according to JIS K6730.

22. A composite tube as claimed in claim 11, wherein said innermost layer has a melt index of from 20 to 80, and wherein said outermost layer has a melt index of from 2 to 7, said melt index being measured at a temperature of 190° C. and a load of 2,160 g according to JIS K6730.

23. A composite tube as claimed in claim 11, wherein the difference between the inner diameter of said heat-shrinkable tube and the outer diameter of said adhesive tube is from 0.1 to 0.3 mm.

24. A hollow adhesive tube, which is capable of being inserted into a heat-shrinkable tube to form a composite tube for waterproof sealing and/or insulation of a joint of wires or cables or for binding of a plurality of wires or cables, wherein the difference between the inner diameter of said heat-shrinkable tube and the outer diameter of said adhesive tube is 0.2 mm., said adhesive tube comprising a double-layered, coextruded thermoplastic resin tube comprising an outermost thermoplastic layer and an innermost thermoplastic layer, said outermost layer having a melt index smaller than that of said innermost layer, wherein the thermoplastic resin is not crosslinked.

* * * * *